(12) United States Patent
Klemm

(10) Patent No.: US 6,991,831 B2
(45) Date of Patent: Jan. 31, 2006

(54) METHOD AND DEVICE FOR PRODUCING SINGLET OXYGEN

(75) Inventor: Jörg Klemm, Krefeld (DE)

(73) Assignee: Natural Energy Solutions, AG, (DE)

( * ) Notice: Subject to any disclaimer, the term of this patent is extended or adjusted under 35 U.S.C. 154(b) by 0 days.

(21) Appl. No.: 10/381,759

(22) PCT Filed: Sep. 28, 2001

(86) PCT No.: PCT/EP01/11255

§ 371 (c)(1),
(2), (4) Date: Sep. 30, 2003

(87) PCT Pub. No.: WO02/26621

PCT Pub. Date: Apr. 4, 2002

(65) Prior Publication Data

US 2004/0058101 A1  Mar. 25, 2004

(30) Foreign Application Priority Data

Sep. 28, 2000 (DE) .............................. 100 48 153

(51) Int. Cl.
*B05D 1/04* (2006.01)
*B05D 3/00* (2006.01)
*C01B 13/00* (2006.01)

(52) U.S. Cl. ................. 427/475; 427/369; 422/123

(58) Field of Classification Search ............... 427/11, 427/242, 457, 458, 469, 475, 485, 486, 355–369
See application file for complete search history.

(56) References Cited

U.S. PATENT DOCUMENTS

| 3,795,443 A | * | 3/1974 | Heine-Geldern et al. ... 430/117 |
| 4,302,480 A | * | 11/1981 | Fischer et al. ............. 435/40.5 |
| 4,579,837 A | | 4/1986 | Busch et al. ................ 502/167 |
| 4,921,589 A | * | 5/1990 | Yates et al. ............... 204/157.5 |

FOREIGN PATENT DOCUMENTS

| DE | 19835456 | | 10/1999 |
| DE | 19835457 | | 2/2000 |
| WO | 97/29044 | * | 8/1997 |
| WO | 9729044 | | 8/1997 |

* cited by examiner

Primary Examiner—Fred J. Parker
(74) Attorney, Agent, or Firm—Ostrolenk, Faber, Gerb & Soffen, LLP

(57) ABSTRACT

The invention relates to a device for producing singlet oxygen, comprising a housing forming a chamber which has at least two opposite surfaces. One of said surfaces is transparent and the other is covered by a coating made from a dye excitable by light, and a light source for irradiating the surface covered with the dye. The surface covered with the dye is formed by a substrate comprising a finely roughened surface. The dye is introduced into the indentations of the finely roughened surface by polishing. The light source can be formed by light emitting diodes, whose light emission comprises a wavelength located within the range of maximum radiation absorption of the dye of the coated surface.

16 Claims, 2 Drawing Sheets

METHOD AND DEVICE FOR PRODUCING SINGLET OXYGEN

BACKGROUND OF THE INVENTION

1. Field of the Invention

The invention relates to a device for producing singlet oxygen as well as to a method for producing a surface coated with a dye for such a device.

2. Description of the Related Art

Such a device for producing singlet oxygen is known from WO 97/29044 A1. With this apparatus, a chamber is formed having two boundary surfaces, one of these surfaces being transparent, whereas the other surface is covered by a coating made from a dye excitable by light radiation. This surface coated with the dye is irradiated with light from a light source disposed adjacent to the transparent surface. The light source is preferably a halogen lamp, and the transparent surface filters out a certain part of the radiation, such that a radiation having a predetermined frequency spectrum is obtained. This light radiation acts upon the dye disposed on the surface coated with the dye, and the oxygen flowing over this surface is brought into an excited condition for forming singlet oxygen. The dye coating is applied by a kinetic, thermal or chemical method on a finely roughened surface or a microporous surface. The efficiency of this known apparatus is only low, and the production of the dye coated surface is quite expensive, and further, large amounts of heat are produced by the use of the halogen lamp.

From the U.S. Pat. No. 4,579,837, it is further known to deposit on a substrate several layers of polycrystalline organic dye, for instance trypaflavine, eosin or tetracene. Also in this case the production of the surface covered with dye is quite expensive.

SUMMARY OF THE INVENTION

The object of the invention is to provide a device as well as a method of the type mentioned above, which allows the production of singlet oxygen with high efficiency and low expense.

This problem is solved by the features of the invention. Advantageous developments and embodiments of the invention are set out below.

With the device according to the invention, a single layer of the dye is introduced into the fine pores on the surface of the substrate by exerting pressure and through friction, said surface being finely roughened and the dye being introduced by polishing it into the indentations of the finely roughened surface. The depth of the indentations or pores determines the thickness of the layer of dye. In this manner, the effort for producing the surface covered with dye is quite low. Further, with this method, the characteristics of the dye are not impaired.

The excitation of the dye is performed preferably by light emitting diodes having an emission wavelength adapted to the absorption peak of the respective dye, this absorption peak lying, with most of the dyes mentioned below, mostly in the region of 600 through 680 nm, a region for which light emitting diodes having a relatively narrow wavelength emission are commercially available.

Since conventional light emitting diodes may be used for exciting the dye, on one hand, a simple and cost-effective structure is obtained, and on the other hand, a high total efficiency of the device is obtained in view of the high efficiency of light emission of such light emitting diodes.

The dye may be for instance green or blue phthalocyanine, methylene blue, rose bengal, a porphyrin (zinc tetraphenylporphyrin) or eosin.

The substrate may preferably be a plexiglass disc, a glass disc or even a metal disc having an insulated surface, preferably an anodized aluminum disc.

For its uniform distribution, the dye may be dissolved in a solvent and may be uniformly distributed on the surface within an electromagnetic field, or the substrate may be electrostatically charged and exposed to a dye mist.

For obtaining the recesses or pores, the substrate may be roughened in a sandblasting procedure.

BRIEF DESCRIPTION OF THE INVENTION

The invention will be explained in more detail with reference to embodiments shown in the drawings, wherein.

DETAILED DESCRIPTION OF THE INVENTION

Figure 1:
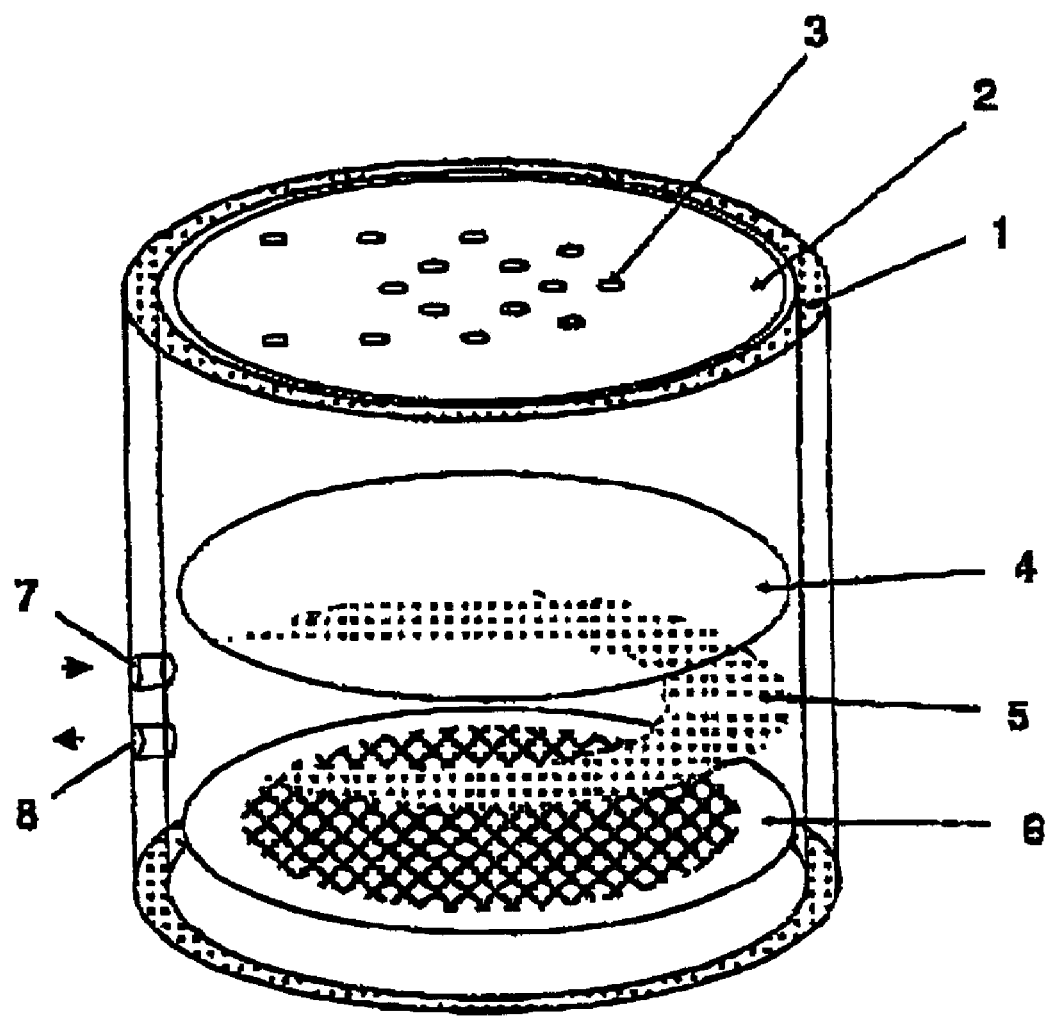
FIG. 1 is an embodiment of the device for the activation of air.

The embodiment of the device shown in FIG. 1 comprises a housing which, in the embodiment shown, has a cylindrical section, but may also be elongated or may have any other cross-section. This housing forms a chamber bounded by a first surface 4 formed by a covering glass plate or any other light transparent plate, as well as by a surface 6 coated with a dye. Between the covering glass plate 4 and the surface 6 coated with the dye, a an air guide and/or a spacer 5 may be disposed to obtain an intimate contact between the oxygen or the oxygen containing gas guided through the chamber and the coated surface 6.

On the side of the covering glass plate 4 opposite to the coated surface 6, a printed circuit board 2 is disposed, which carries light emitting diodes 3, which illuminate the dye on the surface 6 via the covering glass plate 4.

The surface 6 is coated with the dye by taking this surface as the upper surface of a substrate, which is finely roughened and thereby provided with micropores into which the dye is polished by exerting pressure.

For obtaining a uniform distribution of the dye on the coated surface 6, the dye either may be dissolved in an appropriate solvent and then uniformly distributed on the surface within an electromagnetic field, or the substrate is electrostatically charged and is exposed to a dye mist, whereby the electrostatic charge attracts the dye powder, such that also a uniformly thin distribution of the dye particles on the surface is obtained.

In both cases, the surface subsequently is polished such that a stable and uniformly thin adhesion of the dye on the finely roughened surface is obtained.

As dye, especially phthalocyanine, a porphyrin (zinc tetraphenylporphyrin) and eosin are useful. These dyes have a wavelength region of peak absorption between about 600 nm and 680 nm, and light emitting diodes having a light emission in this wavelength region are without any problem commercially available. The excitation peak of singlet oxygen, i.e. the energy being freed on return of the oxygen into its base state, is at 634.3 nm. The excitation energy for the oxygen preferably should have a wavelength somewhat shorter than the 634.3 nm.

On the dye surface excited by the light radiation from the light emitting diodes, excitonic hits against the oxygen molecules are produced, which are contained within the gas fed through the chamber, the peripheral electrons of the oxygen molecules reacting with jumps to the next incompletely occupied electron orbits, such that a singlet oxygen condition results.

The gas containing oxygen or pure oxygen may be fed to the chamber formed between the covering plate 4 and the surface 6 coated with the dye by means of an inlet 7 and may be removed via an outlet 8, as shown in FIG. 1.

Figure 2:
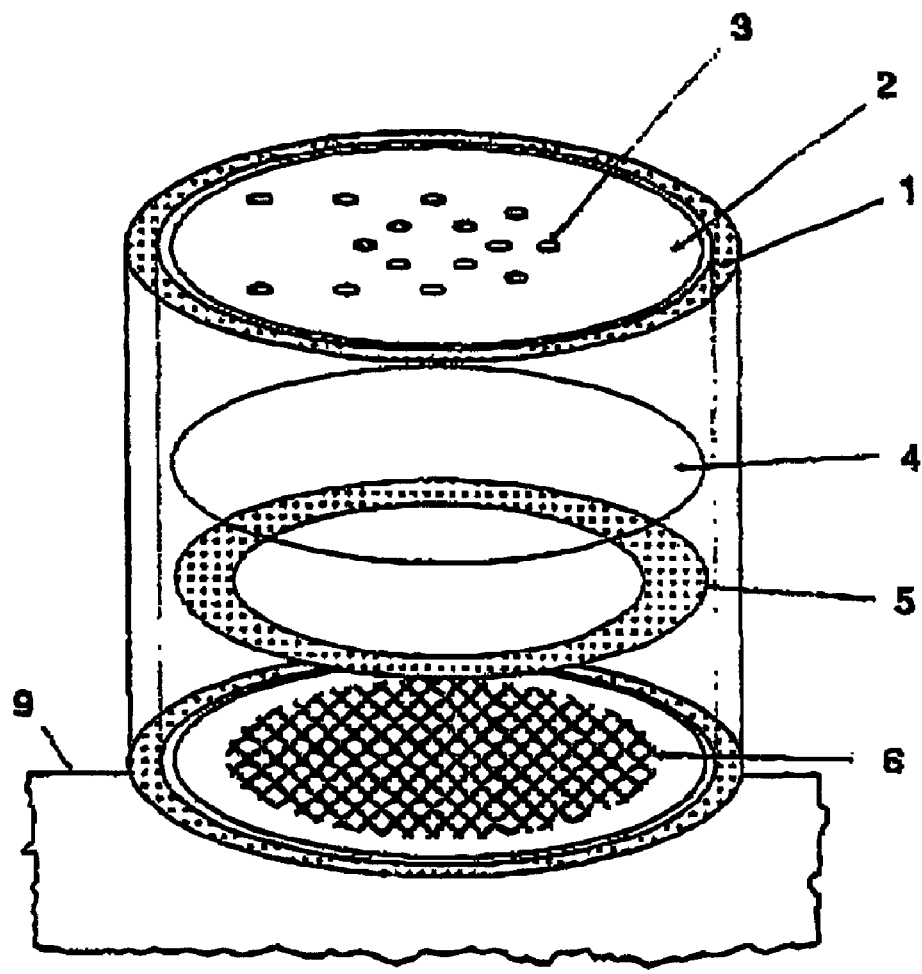
FIG. 2 is an embodiment of the device for activating liquids.

In the embodiment shown in FIG. 2, the gas inlets and gas outlets are omitted, and a light transparent substrate is used over which a gas containing oxygen is disposed. The side of the substrate which is not coated with the dye is in direct contact with the surface 9 of a body or with a liquid which shall be exposed to excitons produced in the dye by the light radiation.

What is claimed is:

1. A device for producing singlet oxygen, comprising a housing forming a chamber which has at least two opposite surfaces, one of these surfaces being transparent, whereas the other surface is covered by a coating made from a dye excitable by light and a light source for irradiating the other surface covered with the dye, wherein said other surface covered with the dye is formed by a substrate comprising a surface finely roughened to form indentations or micropores into which said dye is introduced by polishing, and wherein said light source is formed by light emitting diodes whose light emission comprises a wavelength located within the range of maximum radiation absorption of the dye of the coated surface.

2. Device according to claim 1, wherein said dye is phthalocyanine.

3. Device according to claim 2, wherein the dye is green phthalocyanine.

4. Device according to claim 2, wherein the dye is blue phthalocyanine.

5. Device according to claim 1, wherein the dye is methylene blue.

6. Device according to claim 1, wherein the dye is rose bengal.

7. Device according to claim 1, wherein the dye is zinc tetraphenylporphyrin.

8. Device according to claim 1, wherein the dye is eosin.

9. Device according to claim 1, wherein the light emission of the light emitting diodes is located in a spectral region between about 600 nm and 680 nm.

10. Device according to claim 1, wherein the substrate comprises a plexiglass disc.

11. Device according to claim 1, wherein the substrate comprises a glass disc.

12. Device according to claim 1, wherein the substrate comprises an anodized aluminum plate.

13. A method for producing a dye coated surface for a device for producing singlet oxygen, said device comprising a housing forming a chamber which has at least two opposing surfaces, one of these surfaces being transparent, whereas the other surface is covered by a coating made from a dye excitable by light and a light source for irradiating the other surface covered with the dye, said method comprising the steps of:
providing a substrate with a finely roughened surface to form micropores;
uniformly distributing a dye on said finely roughened surface; and
introducing the dye into the micropores of the finely roughened surface by exerting pressure and polishing to produce said dye coated.

14. A method according to claim 13, wherein the step of uniformly distributing the dye includes dissolving the dye in a solvent and uniformly distributing the dissolved dye on said surface within an electromagnetic field.

15. A method according to claim 13, wherein the step of uniformly distributing the dye includes electrostatically charging the substrate and exposing the substrate to a dye mist.

16. A method according to claim 13, wherein a plastic material disc is used as substrate and is finely roughened by a sand blasting method to form the indentations or micropores.

\* \* \* \* \*